United States Patent
Companje

(10) Patent No.: US 11,413,800 B2
(45) Date of Patent: Aug. 16, 2022

(54) MOLDING COMPOSITIONS AND ARTICLES MADE THEREOF

(71) Applicant: KRATON POLYMERS LLC, Houston, TX (US)

(72) Inventor: Richard Companje, Amsterdam (NL)

(73) Assignee: KRATON POLYMERS LLC, Houston, TX (US)

( * ) Notice: Subject to any disclaimer, the term of this patent is extended or adjusted under 35 U.S.C. 154(b) by 278 days.

(21) Appl. No.: 16/869,769

(22) Filed: May 8, 2020

(65) Prior Publication Data

US 2020/0368947 A1 Nov. 26, 2020

Related U.S. Application Data

(60) Provisional application No. 62/850,029, filed on May 20, 2019.

(51) Int. Cl.
| | | |
|---|---|---|
| *B29C 45/00* | (2006.01) | |
| *C08L 23/14* | (2006.01) | |
| *C08L 53/02* | (2006.01) | |
| *B29K 9/06* | (2006.01) | |
| *B29K 23/00* | (2006.01) | |
| *B29K 96/04* | (2006.01) | |
| *B29L 31/30* | (2006.01) | |

(52) U.S. Cl.
CPC .......... *B29C 45/0001* (2013.01); *C08L 23/14* (2013.01); *C08L 53/025* (2013.01); *B29K 2009/06* (2013.01); *B29K 2023/06* (2013.01); *B29K 2023/12* (2013.01); *B29K 2023/16* (2013.01); *B29K 2096/04* (2013.01); *B29K 2995/0017* (2013.01); *B29K 2995/0022* (2013.01); *B29L 2031/302* (2013.01); *B29L 2031/3008* (2013.01)

(58) Field of Classification Search
CPC .............................. B29C 45/0001; C08L 23/14
See application file for complete search history.

(56) References Cited

U.S. PATENT DOCUMENTS

| | | | |
|---|---|---|---|
| 4,130,534 A | 12/1978 | Coran et al. | |
| 4,130,535 A | 12/1978 | Coran et al. | |
| 4,313,867 A | 2/1982 | Duvdevani | |
| 4,594,390 A | 6/1986 | Abdou-Sabet et al. | |
| 5,100,947 A | 3/1992 | Puydak et al. | |
| 5,157,081 A | 10/1992 | Puydak et al. | |
| 5,177,147 A | 1/1993 | Spenadel et al. | |
| 5,290,886 A | 3/1994 | Ellul | |
| 5,656,693 A | 8/1997 | Ellul et al. | |
| 2006/0155072 A1* | 7/2006 | Rakhman | C08F 255/02 525/242 |
| 2015/0017366 A1 | 1/2015 | Tranninger et al. | |

FOREIGN PATENT DOCUMENTS

| | | |
|---|---|---|
| EP | 2757131 A1 | 7/2014 |
| WO | 92/02582 | 2/1992 |

\* cited by examiner

*Primary Examiner* — Nicholas R Krasnow

(57) ABSTRACT

Injection molded articles having improved scratch resistance and reduced gloss change after heat and UV aging are disclosed. The article is formed from a molding composition having a melt flow index of 50-350 g/10 (230° C., 2.16 kg) as measured by ASTM D1238-04, the composition consisting essentially of: a) 15-80 wt. % of a hydrogenated styrenic block copolymer having a melt index of at least 12 grams/10 minutes according to ASTM D1238 at 230° C. and 2.16 kg weight; b) 10-60 wt. % of a polypropylene having a melt flow index greater than 300 g/10 min, measured under 230° C./2.16 kg according to ISO 1133-1; and c) 5-25 wt. % of a thermoplastic vulcanizate having a Shore A hardness from 60-90 (15 sec, 23° C.) as measured according to ISO 868. The article has a gloss increase after 10 days of aging at 120° C. of less than 100%, relative to an initial gloss, as determined by PSA D47 1850.

20 Claims, No Drawings

MOLDING COMPOSITIONS AND ARTICLES MADE THEREOF

RELATED APPLICATIONS

This application claims priority from U.S. Provisional Application No. 62/850,029, with a filing date of May 20, 2019, the entire disclosure is incorporated herein by reference.

FIELD

This disclosure relates to a molding composition, methods for preparation, and articles made thereof.

BACKGROUND

Soft touch materials have found applications in many industries, e.g., automotive interior components such as interior trim, interior sheathing, door panels, instrument panels, and consoles. Electronic industries also utilize soft touch materials on protective coverings and grips of hand held devices. Other applications include but are not limited to tool handles, tooth brushes, over molding, and injection molding applications.

Much effort has been put into developing polymeric compositions that exhibit desirable properties, lower costs, or both. For some applications, it is desirable to improve on one or more of tactile characteristics of the polymeric articles, low gloss surface appearance, or durability characteristics. For vehicles with passengers contact with automotive interiors, it is desirable to employ a material with a soft touch tactile sensation and is durable to withstand frequent touching and scratching. One way to impart a soft touch feel is single step or multi-step injection molding of thermoplastic or plastic compositions, forming the articles. In the multi-step process, a secondary layer of functional material is applied on top of a molded article through over molding, painting or other technique.

There is still a need for improved polymer compositions exhibiting a relatively soft touch feel, with one or more desirable properties including low gloss, mar resistance, scratch resistance, low temperature ductility, dimension stability or combinations thereof.

SUMMARY

In an aspect, the disclosure relates to an injection molded article. The article is formed from a molding composition consisting essentially of: a) 15-80 wt. % of a hydrogenated styrenic block copolymer having a general formula: S-E-S, (S-E1)n, (S-E1)nS, (S-E1)nX or mixtures thereof, n has a value of 2 to 6 and X is a coupling agent residue, wherein prior to hydrogenation, the S block is a polystyrene block having a molecular weight from 5,000 to 7,000, the E block is a polydiene block, selected from the group consisting of polybutadiene, polyisoprene and mixtures thereof, having a molecular weight of from 30,000 to 70,000, the E1 block is a polydiene block, selected from the group consisting of polybutadiene, polyisoprene and mixtures thereof, having a molecular weight of from 15,000 to 35,000; b) 10-60 wt. % of a polypropylene; and c) 5-25 wt. % of a thermoplastic vulcanizate; wherein the hydrogenated styrenic block copolymer has a melt index of at least 12 g/10 minutes according to ASTM D1238 at 230° C. and 2.16 kg weight; wherein the polypropylene has a melt flow index greater than 300 g/10 min as measured according to ISO 1133-1 condition 230° C./2.16 kg; wherein the thermoplastic vulcanizate has a Shore A hardness from 60-90 (15 sec, 23° C.) as measured according to ISO 868; wherein the molding composition has a melt flow index of 50-350 g/10 (230° C., 2.16 kg) as measured by ASTM D1238-04; and wherein the injection molded article after 10 days of aging at 120° C., has a % gloss increase of less than 100, relative to an initial gloss, as determined by PSA D47 1850.

In an aspect, the disclosure relates to a method of preparing an injection molded article formed by: (a) forming a molding composition as previously described and (b) forming the injection molded article from the molding composition by injection molding, overmolding, rotomolding, thermoforming, casting, extrusion, profile extrusion, or blow molding. The injection molded article after 10 days of aging at 120° C. has gloss that is at least 100% greater than the gloss of the article prior to the aging, as determined by PSA D47 1850.

DESCRIPTION

The following terms are used in the specification and will have the following meanings:

"Molecular weight" refers to the styrene equivalent molecular weight in g/mol of a polymer block or a block copolymer. The molecular weights can be measured with gel permeation chromatography (GPC) using polystyrene calibration standards, such as is done according to ASTM 5296-19. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector can be a combination ultraviolet and refractive index detector. The molecular weights expressed herein are measured at the peak of the GPC trace, converted to true molecular weights, and are commonly referred to as "peak molecular weights", designated as Mp. Unless converted to true molecular weights, as described above, the molecular weights refer to the styrene equivalent peak molecular weights.

"True molecular weight" of a polymer block or copolymer refers to a styrene-equivalent molecular weight determined using GPC and polystyrene calibration standards according to ASTM 5296-11.

"Vinyl content" refers to the content of a conjugated diene that is polymerized via 1,2-addition in the case of butadiene, or via 3,4-addition in case of isoprene.

"Polystyrene content" or PSC of a block copolymer refers to the % weight of polystyrene in the block copolymer, calculated by dividing the sum of molecular weight of all polystyrene blocks by the total molecular weight of the block copolymer. PSC can be determined using proton nuclear magnetic resonance (NMR).

"Melt Flow Index" of components in the molding composition is measured in accordance with ISO 1133-1 at a temperature of 230° C. and under a load condition of 2.16 kg. Melt Flow Index of the molding composition can be measured according to ASTM D1238-04 at a temperature of 230° C. and under a load condition of 2.16 kg.

"Shore A hardness" is a measure of indentation resistance of elastomeric or soft plastic materials based on the depth of penetration of a conical indentor, and can be measured according to ISO-868.

"Scratch resistance" is a measure of resistance to scratch and can be determined according to PSA D45-5523.

"Density" can be measured using test method ISO 1103.

"Gloss" can be measured according to PSA D47 1850.

The disclosure relates to articles made by injection molding, with the molded layer being one component, two component, or overmolded, having improved scratch, abrasion and reduced gloss change characteristics after heat and UV-aging. The layer consists essentially of a styrenic block copolymer, high-flow polypropylene, and a thermoplastic vulcanizate.

Styrenic Block Copolymer (SBC) Component: The injection molded layer comprises one or more styrenic block copolymers, each characterized as having a high melt flow rate of at least 12 g/10 min (230° C./2.16 kg).

In embodiments, the HSBC has a general formula: S-E-S, $(S-E_1)_n$, $(S-E_1)_n S$, $(S-E_1)_n X$ or mixtures thereof, n has a value of 2 to 6 and X is a coupling agent residue. The SBC includes <15 wt. % diblock, lower molecular weight units having the general formula S-E or $S-E_1$. Prior to hydrogenation, the S block is a polystyrene block. The molecular weight of each of the S blocks is from 5,000 to 7,000. Prior to hydrogenation, the E block is a polydiene block, selected from the group consisting of polybutadiene, polyisoprene and mixtures thereof, having a molecular weight of from 30,000 to 70,000. Prior to hydrogenation, the $E_1$ block is a polydiene block, selected from the group consisting of polybutadiene, polyisoprene and mixtures thereof, having a molecular weight of from 15,000 to 35,000.

In embodiments, the styrene content of the block copolymer is from 13 to 25 wt. %. The vinyl content of the polydiene block prior to hydrogenation is from 70 to 85 mol %. Subsequent to hydrogenation, about 0-10% of the styrene double bonds have been hydrogenated and at least 80% of the conjugated diene double bonds have been hydrogenated. In embodiments, the HSBC has a melt index of at least 12 grams/10 minutes, or at least 20 grams/10 minutes, or at least 75 grams/10 minutes according to ASTM D1238 at 230° C. and 2.16 kg weight.

In yet other embodiments, the SBC is a very high melt-flow hydrogenated block compolymer comprising: (a) 0 to 5 weight percent of a tetra-branched block copolymer (IV) having a number average molecular weight of 44,000 to 80,000, represented by the general formula (A-B)4X; (b) greater than 0 to 60 weight percent of a tri-branched block copolymer (III) having a number average molecular weight of from 33,000 to 60,000, represented by the general formula $(A-B)_3 X$; (c) 40 to 95 weight percent of a di-branched block copolymer (II) having a number average molecular weight of from 22,000 to 40,000, represented by the general formula $(A-B)_2 X$; and (d) 2 to 10 weight percent of a linear diblock copolymer (I) having a number average molecular weight of from 11,000 to 20,000, represented by the general formula A-B. In the formulae, A represents a polymer block of a mono alkenyl arene, having a number average molecular weight ranging from 4,000 to 7,000 g/mol. B represents a polymer block of a conjugated diene, having a number average molecular weight ranging from 7,000 to 13,000 g/mol. X represents the residue of an alkoxy silane coupling agent. The SBC has a vinyl content of 30 to 50 mol %.

In yet a third embodiment, the SBC is an ultra-high melt flow rate (a melt index of 80 to 600 g/10 min. at 190° C. and 2.16 kg weight), selectively hydrogenated block copolymer having an S block and an E or $E_1$ block and having a general formula: S-E-S, $(S-E_1)_n X$, or mixtures thereof. In the formula, n has a value of 2 to 6; X is a coupling agent residue; molecular weight of the S block is 4,400 to 5,600 g/mol. The polystyrene content in the block copolymer is 25 to 40 wt. %. Up to 50 wt. % of diblock units in the block copolymer has a general formula S-E or $S-E_1$. Prior to hydrogenation: the S block is a polystyrene block; the E block is a polydiene block selected from the group consisting of polybutadiene, polyisoprene and mixtures thereof, and having a molecular weight of from 18,000 to 26,000 g/mol; the $E_1$ block is a polydiene block selected from the group consisting of polybutadiene, polyisoprene and mixtures thereof, and having a molecular weight of from 9,000 to 13,000 g/mol. The total vinyl content of the polydiene block is 60 to 85%. Subsequent to hydrogenation: 0-10 percent of styrene double bonds in the block copolymer are reduced, and at least 80 percent of conjugated diene double bonds in the block copolymer are reduced.

The SBC component is present in amounts of 15-80 wt. %, or 20-80 wt. %, or 30-80 wt. %, or 40-80 wt. %, or at least 20 wt. %, or at least 30 wt. %, or at least 40 wt. % based on the total weight of the molding composition. In embodiments, the SBC component is a mixture of at least two different SBCs, in a weight ratio ranging from 20:40 to 40:20 or from 25:35 to 35:25, or from 30:30 to 30:30, or from 35:25 or 25:35.

Polypropylene Component: The polypropylene in embodiments is a high flow polypropylene, selected from: (i) a homopolymer of propylene, (ii) a random copolymer of propylene and an olefin selected from ethylene and $C_4$-$C_{10}$ α-olefins, or (iii) a random terpolymer of propylene with two α-olefins selected from the group of ethylene and $C_4$-$C_{10}$ α-olefins. The $C_4$-$C_{10}$ α-olefins include linear and branched $C_4$-$C_{10}$ α-olefins such as 1-butene, 1-pentene, 4-methyl-pentene-1, 3-methyl-1-butene, 1-hexene, 3-4-dimethyl-1-butene, 1-heptene, 3-methyl-1-hexene, 1-octene and the like.

In embodiments, the propylene polymer is a heterophasic propylene copolymer ("HECO") as disclosed in U.S. Patent Publication US20150017366A1, incorporated herein by reference. The copolymer comprises a polypropylene matrix with three different polypropylene fractions, with the three polypropylene fractions differ in the melt flow rate, and with the HECO having a melt flow rate (230° C.) measured according to ISO 1133 of equal or more than 20.0 g/10 min.

In embodiments, the propylene polymer has a melt flow higher than 30 dg/min as measured by ASTM D1238-82 (230° C./5 kg), or at least 50 dg/min, or at least 60 dg/min, or at least 70 dg/min, or at least 80 dg/min. In embodiments, the polypropylene has a melt flow of greater than 500 g/10 min (230° C., 2.16 kg) as measured according to ISO 1131-1, or greater than 800 g/10 min, or greater than 900 g/10min, or greater than 1000 g/10 min. In embodiments, the polypropylene has an ultra-high melt flow property of at least 1500 g/10 min., or at least 1800 g/10 min., or at least 1850 g/10 min. In one embodiment, the propylene component is a homopolymer of propylene.

The propylene is present in the molding composition in an amount of 10-60 wt. %, or 10-55, or 15-50, or 15-40 wt. %, 20-40 wt. %, or 20-30 wt. %, based on the total weight of the molding composition.

Thermoplastic Vulcanizate (TPV) Component: TPV refers to a thermoplastic elastomer in which a cured elastomeric phase is dispersed in a thermoplastic material. TPV is also sometimes referred to as"elastoplastic" or "heterophasic" compositions. TPV includes at least a thermoplastic material and at least one cured (i.e., crosslinked) elastomeric material. The thermoplastic material forms a matrix, or a continuous phase, and the cured elastomer forms a discontinuous phase with domains of the cured elastomer dispersed in the thermoplastic matrix.

In embodiments, the domains of the cured elastomer are uniformly dispersed through the continuous phase of the thermoplastic material.

In embodiments, TPVs are based on blends of ethylene-propylene-diene elastomeric polymers or ethylene, α-olefin, diene elastomeric polymers with semi-crystalline or crystalline polymers, made by dynamically curing the blend of rubber and resin. An example is a dynamically vulcanized alloy mostly of fully cured ethylene propylene diene methylene (EPDM) rubber particle encapsulated in a polypropylene matrix. In other examples, the TPV comprises a microgel dispersion of a cured elastomer, such as EPDM rubber, butyl rubber, chlorinated butyl rubber, polybutadiene or polyisoprene in an uncured matrix of a thermoplastic polymer such as polypropylene. The TPV can be prepared by the polymerization of one or more, usually two or more, α-monoolefins, preferably with a polyene, generally a diene, as generally disclosed in U.S. Pat. Nos. 4,130,534; 4,130,535; 4,5943,90; 5,100,947; 5,157,081; 5,177,147; 5,290,886 and in PCT Publication No. WO 9202582, incorporated by reference.

In embodiments, the TPV is made with an ethylene, α-olefin, diene monomer elastomeric polymer containing vinyl norbornene as the diene monomer, a crystalline or semi-crystalline thermoplastic, and a curing content as disclosed in U.S. Pat. No. 5,656,693A, incorporated herein by reference. The TPV has an ethylene content of 40-90 mole %, vinyl norbornene from 0.2-4 mole %, and the remainder generally includes an α-olefin with propylene being preferred. The thermoplastic component is selected from polypropylene, polyethylene, polybutylene, or their copolymers, polyethylene teraphthalate (PET), polybutylene teraphthalate (PBT), polyamide (PA), and combinations thereof. The curative will generally be peroxides. The TPV has a Mooney viscosity (ML) at 125° C. of at least 10.

In embodiments, the TPV comprises blends of olefin rubber having a high Mooney Viscosity and thermoplastic olefin resin in which the rubber is cured by a phenolic curative, as disclosed in US Publication No. 20040147677A1, incorporated by reference. The rubber is in the form of particles of a number average size of <50 microns, and the rubber has a Mooney Viscosity of at least 100 MU as measured on uncured, raw rubber.

In embodiments, the TPV is as disclosed in US Publication No. 2017/0247536, incorporated herein by reference. The composition comprises a propylene-based polymer as the continuous phase of the TPV, and a crosslinked olefin block copolymer (OBC) as the discontinuous phase dispersed in the propylene-based polymer. OBC refers to a multi-block or segmented copolymer with segments (or blocks) joined in a linear manner, comprising a propylene α-olefin copolymer, a scorch retardant, and a crosslinking agent, prepared as disclosed in US2017/0247536. The propylene α-olefin can be any of a propylene/ethylene copolymer, or a random propylene/ethylene copolymer.

In embodiments, after the TPV is formulated, the molten TPV formulation is extruded through a 200 mesh or finer screen to further enhance the surface smoothness as disclosed in US Publication No. 20190106560A1, incorporated by reference.

In embodiments, the TPV has a high melt flow rate of at least 10 g/10 min (ISO 1133 230° C./2.16 kg), or at least 15 g/10 min, or at least 20 g/10 min. In embodiments, the TPV can be any of an extrusion-grade TPV and a molding-grade TPV, having a Shore A hardness from 60-90, or from 64-80 (15 sec, 23° C.) as measured by ISO 868 test method; a density from 0.880 to 0.980 g/cm$^3$, or from 0.900 to 0.970 g/cm$^3$ as measured by ISO 1183 test method.

In embodiments, the TPV has a high melt flow rate of at least 10 g/10 min (ISO 1133 230° C./2.16 kg), or at least 15 g/10 min, or at least 20 g/10 min. In embodiments, the TPV can be any of an extrusion-grade TPV and a molding-grade TPV, having a Shore A hardness from 60-90, or from 64-80 (15 sec, 23° C.) as measured by ISO 868 test method; a density from 0.880 to 0.980 g/cm$^3$, or from 0.900 to 0.970 g/cm$^3$ as measured by ISO 1183 test method.

The TPV is present in amounts of 5-25 wt. %, or 7-20 wt. %, or 10-20 wt. %, or at least 7 wt. %, or at least 10 wt. % based on the total weight of the molding composition.

Additive: In embodiments, the composition further comprises one or more additives selected from a nucleating agent, a clarifier, a release agent, a plasticizer, an antioxidant, a stabilizer (such as a thermal stabilizer, a visible light stabilizer, an ultraviolet light stabilizer, a colorant, a flame retardant, a lubricant (such as calcium stearate), a synergist, a mold release agent, a flow enhancer, an anti-static agent, a glass filler, a filler that is different from the glass filler (such as talc), a scratch resistant additive/surface modifier (such as a silicone, a low density polyethylene that can be a long chain branched low density polyethylene), or a combination comprising at least one of the foregoing.

In embodiments, the plasticizer is a mineral oil. Examples of suitable oil include hydrocarbon based oils having an average molecular weight (calculated from the kinematic viscosity per ASTM D2502) in the range of about 100 to about 1000 g/mol.

Examples of surface modifiers include ultra-high molecular weight polydialkyl siloxanes such as polydimethyl siloxanes, ultra high molecular weight polydialkyl siloxanes in combination with silica, polyolefin siloxanes and combinations thereof.

The additive may be present in the amount of 1 to 15 wt. %, or 3 to 13 wt. %, or less than 10 wt %, based on the total weight of the molding composition.

Properties of the Molding Composition: The molding composition is characterized as having a melt flow index of at least 50 g/10 min (230° C., 2.16 kg per as measured by ASTM D1238-04), or at least 60 g/10 min, or at least 70 g/10 min., or between 50-250 g/10 min, or between 50-350 g/10 min, or at least 90 g/10 min, or at least 100 g/10 min.

Methods for processing the composition/forming articles: The molding composition can be processed according to methods known in the art, with the components combined and blended by melt mixing/extruded into pellets, subsequently forming articles by known techniques, such as injection molding, overmolding, rotomolding, thermoforming, casting, extrusion, profile extrusion, and blow molding.

In an aspect, the molding composition is injected over a polyolefnic layer or substrate to form articles. The polyolefinic layer or substrate may be heated to, and kept at, a first temperature of from about 180° C. to 240° C. during the fusion and solidification of the blend, for the molding composition to adhere by fusion onto the polyolefinic layer or substrate.

In embodiments, the molding composition forms a layer, either by itself or overmolded as a layer on a polyolefinic substrate, having a thickness of at least 0.5 mm each, or 0.5 to 2.0 mm thick, or 0.8 to 1.4 mm thick, or 0.9 to 1.2 mm thick, or less than 3.0 mm thick.

Properties of Molded Articles: An article made from the molding composition in embodiments has an initial gloss measurement as determined by PSA D47 1850 at 60° of less than 5, or less than 3, or less than 2, or less than 1.5. After 10 days of aging at 120° C., the gloss is less than 10, or less than 7, or less than 5, or less than 4. After 10 days of aging at 120° C., the article has a % gloss increase of less than 100, or less than 70, or less than 50, or less than 30, or less than 10.

In embodiments, articles made from the molding composition have very good scratch resistance as measured according to PSA D54 5523 with a load of 3 Newton (N).

In embodiments, molded articles have excellent color fastness or wilting after heat aging and exposure to light as measured according to D47 1431 at medium (85° C.) or high (100° C.) temperature, with color variation being measured before and after exposure to light.

Applications: The molding composition can be used for automotive applications, e.g., interior trim, interior sheathing, door panels, instrument panels, and consoles, having good heat stability, scratch resistance, and improved gloss values after aging. The molding composition is useful in injection molding, overmolding, and extrusion applications.

EXAMPLES

The Examples are Given for Illustration Only

Examples 1-9

The components in Table 1 were compounded and pelletized by a twin screw extruder and then injection molded into 2 mm thick false leather grain, and evaluation was carried out. The test samples were aged in a hot air oven at 120° C. for 240 hours (10 days) at which time the gloss was measured with a gloss meter having angel of 60 degrees. The scratch resistance test was performed with an Erichsen 318s pencil. The scratch resistance rating can be determined and shown as negative sign (−) equals negative results and a positive sign (+) equals positive results. The more positive signs (+, ++, or +++) the better the scratch resistance. Results are as shown in the Table.

The major components used in the examples are as follows.

HFPP1 is a high flow polypropylene having a melt flow rate (230° C./2.16 kg) of 800 g/10 min.

HFPP2 is a high flow polypropylene having a melt flow rate (230° C./2.16 kg) of 1200 g/10 min.

HFPP3 is another high flow polypropylene resin with narrow molecular weight distribution with density of 0.90 g/cm$^3$, and a melt flow (230° C./2.16 kg) of 1200 g/10 min.

TPV is a phenolic-type cured blend of polypropylene and ethylene propylene diene (EPDM) copolymer, having a density of 0.970 g/cm$^3$, a Shore A hardness, 15 sec, 23° C., 2.00 mm (ISO 688) of 69; a tensile stress at 100% across flow (23° C.) of 2.60 Mpa and a tensile strength at break—across flow (23° C.) of 7.00 Mpa, elongation at break across flow of 450%, all according to ASTM D412.

HSBC 53 is a styrene-ethylene-butylene-styrene (SEBS) block copolymer with a melt flow rate (230° C./2.16 kg) of 20-28 g/10 min, a PSC of 30 wt %, a di-block concentration of <10 wt. %, and Shore A hardness of 73.

HSBC 48 is a low molecular weight SEBS polymer with an ultra-high melt flow rate 220 g/10 min at 230° C. and 2.16 kg, tensile strength of 11 MPa, and elongation at break of 750%.

TABLE 1

| Component | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| HSBC 53 | 52 | 51 | 67.5 | 50.5 | 50.5 | 33.5 | 52 | 53.5 | 51 |
| HFPP1 | 23 | 23 | 17 | 34 | | 51 | 20 | 31.5 | 20 |
| HFPP2 | | | | | 34 | | | | |
| Polybutalene | 10 | 10 | | | | | | | |
| TPV | | | | | | | | | 15 |
| Plasticizer - white mimeral oil | 7 | 8 | 8 | 8 | 8 | 8 | 7 | 7 | 7 |
| Siloxane polymer additive | 4 | 4 | 4 | 4 | 4 | 4 | 4 | 4 | 4 |
| Erucamide slip agent | 0.5 | 0.5 | 0.5 | 0.5 | 0.5 | 0.5 | 0.5 | 0.5 | 0.5 |
| Sterically hindered phenolic antioxidant | 0.1 | 0.1 | 0.1 | 0.1 | 0.1 | 0.1 | 0.1 | 0.1 | 0.1 |
| Phosphite antioxidant | 0.2 | 0.2 | 0.2 | 0.2 | 0.2 | 0.2 | 0.2 | 0.2 | 0.2 |
| UV light absorber | 0.3 | 0.3 | 0.3 | 0.3 | 0.3 | 0.3 | 0.3 | 0.3 | 0.3 |
| High MW hindered amine light stabilizer | 0.4 | 0.4 | 0.4 | 0.4 | 0.4 | 0.4 | 0.4 | 0.4 | 0.4 |
| Pigment (Color MB) | 2.5 | 2 | 2 | 2 | 2 | 2 | 2 | 2 | 2 |
| MFI 230° C./2.16 kg | | 138 | 66 | 128 | 143 | 240 | | | 90 |
| Scratch performance 3N | | − | + | ++ | ++ | + | | | |
| Scratch performance 5N | | | | | | | | ++ | + | +++ |
| Gloss at 60 degree angle | 1.3 | 2.5 | 3.2 | 3 | 3 | 2.7 | 3 | 2.9 | 2.7 |
| Gloss after aging 10 days 120° C. | 31 | 3.6 | 5.5 | 3.8 | 4 | 3.7 | 3.6 | 3.4 | 2.9 |
| Gloss increase % - after 10 days at 120° C. | 138.5 | 44 | 72 | 27 | 33 | 37 | 20 | 17 | 7 |

Examples 10-15

The examples are repeated but with two different SBC as shown in Table 2. The samples were injection molded into 1 mm thick JLR grain plaques, and evaluation was carried out in the same manner as with the previous examples. Results are as shown in Table below:

TABLE 2

| Component | Ex. 10 | Ex. 11 | Ex. 12 | Ex. 13 | Ex. 14 | Ex. 15 |
|---|---|---|---|---|---|---|
| HSBC 53 | | 39 | 10 | 20 | 30 | 40 |
| HSCB 48 | 58 | 19 | 50 | 40 | 30 | 20 |
| HFPP3 | 19 | 20 | 22 | 22 | 22 | 22 |
| Polybutylene | 10 | | | | | |
| TPV | | | 10 | 10 | 10 | 10 |
| Plasticizer - white mimeral oil | 5 | 4 | | | | |
| Siloxane polymer additive | 4 | 4 | 4 | 4 | 4 | 4 |
| Erucamide slip agent | 0.5 | 0.5 | 0.5 | 0.5 | 0.5 | 0.5 |
| Sterically hindered phenolic antioxidant | 0.1 | 0.1 | 0.1 | 0.1 | 0.1 | 0.1 |
| Phosphite antioxidant | 0.2 | 0.2 | 0.2 | 0.2 | 0.2 | 0.2 |
| UV light absorber | 0.3 | 0.3 | 0.3 | 0.3 | 0.3 | 0.3 |
| High MW hindered amine light stabilizer | 0.4 | 0.4 | 0.4 | 0.4 | 0.4 | 0.4 |
| Pigment (Color MB) | 2.5 | 2.5 | 2.5 | 2.5 | 2.5 | 2.5 |
| | 100 | 100 | 100 | 100 | 100 | 100 |
| MFI 230/2.16 | 474 | 165 | 245 | 192 | 160 | 130 |
| Scratch performance 3N | | ++ | + | ++ | ++ | ++ |
| Scratch performance 5N | | ++ | + | ++ | ++ | ++ |
| Gloss 60° C. | 1.4 | 1.6 | 1.4 | 1.5 | 1.5 | 1.6 |
| Gloss after aging 10 days 120° C. | 5.8 | 2.8 | 5.4 | 4.1 | 3.2 | 2.9 |
| Gloss increase % | 314% | 75% | 286% | 173% | 113% | 81% |

In general, the disclosure may alternately comprise, consist of, or consist essentially of, any appropriate components herein disclosed. The disclosure may additionally, or alternatively, be formulated so as to be devoid, or substantially free, of any components, materials, ingredients, adjuvants or species used in the prior art compositions or that are otherwise not necessary to the achievement of the function and/or objectives of the present disclosure.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. An injection molded article formed from a molding composition consisting essentially of:
   a) 15-80 wt. % of a hydrogenated styrenic block copolymer having a general formula: S-E-S, $(S-E_1)_n$, $(S-E_1)_nS$, $(S-E_1)_nX$ or mixtures thereof, n has a value of 2 to 6 and X is a coupling agent residue,
   wherein prior to hydrogenation,
      the S block is a polystyrene block having a molecular weight from 5,000 to 7,000,
      the E block is a polydiene block, selected from the group consisting of polybutadiene, polyisoprene and mixtures thereof, having a molecular weight of from 30,000 to 70,000,
      the $E_1$ block is a polydiene block, selected from the group consisting of polybutadiene, polyisoprene and mixtures thereof, having a molecular weight of from 15,000 to 35,000;
   b) 10-60 wt. % of a polypropylene; and
   c) 5-25 wt. % of a thermoplastic vulcanizate;
   wherein the hydrogenated styrenic block copolymer has a melt index of at least 12 g/10 minutes according to ASTM D1238 at 230° C. and 2.16 kg weight;
   wherein the polypropylene has a melt flow index greater than 300g/10 min as measured according to ISO 1133-1 condition 230° C./2.16 kg;
   wherein the thermoplastic vulcanizate has a Shore A hardness from 60-90 (15 sec, 23° C.) as measured according to ISO 868;
   wherein the molding composition has a melt flow index of 50-350 g/10 (230° C., 2.16 kg) as measured by ASTM D1238-04; and
   wherein the injection molded article, after 10 days of aging at 120° C., has a % gloss increase of less than 100, relative to an initial gloss, as determined by PSA D47 1850.

2. The article of claim 1, wherein the thermoplastic vulcanizate is a dynamically vulcanized alloy consisting essentially of fully cured ethylene propylene diene methylene rubber particle encapsulated in a polypropylene matrix.

3. The article of claim 1, wherein the thermoplastic vulcanizate has a density of from 0.880 to 0.980 g/cm³ as measured by ISO 1183.

4. The article of claim 1, wherein the molding composition forms a layer having a thickness of at least 0.5 mm.

5. The article of claim 1, wherein the polypropylene is selected from: (i) a homopolymer of propylene, (ii) a random copolymer of propylene and an olefin selected from ethylene and $C_4$-$C_{10}$ α-olefins, and (iii) a random terpolymer of propylene with two α-olefins selected from the group of ethylene and $C_4$-$C_{10}$ α-olefins.

6. The article of claim 1, further comprising from 1-15 wt. % of one or more additives selected from the group consisting of a nucleating agent, a clarifier, a release agent, a plasticizer, an antioxidant, a thermal stabilizer, a visible light stabilizer, an ultraviolet light stabilizer, a colorant, a flame retardant, a lubricant, a synergist, a mold release agent, a flow enhancer, an anti-static agent, a filler, a scratch resistance additive, and a surface modifier.

7. The article of claim 1, wherein the article is formed by any of injection molding, overmolding, rotomolding, thermoforming, casting, extrusion, profile extrusion, and blow molding.

8. The article of claim 1, wherein the article is a vehicle interior product having positive scratch resistance, wherein the article is selected from interior trim, interior sheathing, door panels, instrument panels, and consoles.

9. The article of claim 1, having a gloss at 60° C. of less than or equal to 10 as measured by PSA D47 1850.

10. The article of claim 1, having a gloss after 10 days of aging at 120° C. of less than or equal to 15 as measured by PSA D47 1850.

11. A method of preparing an injection molded article formed by:
(a) forming a molding composition, said molding composition consisting essentially of:
a) 15-80 wt. % of a hydrogenated styrenic block copolymer having a general formula: S-E-S, $(S-E_1)_n$, $(S-E_1)_nS$, $(S-E_1)_nX$ or mixtures thereof, n has a value of 2 to 6 and X is a coupling agent residue,
wherein prior to hydrogenation,
the S block is a polystyrene block having a molecular weight from 5,000 to 7,000,
the E block is a polydiene block, selected from the group consisting of polybutadiene, polyisoprene and mixtures thereof, having a molecular weight of from 30,000 to 70,000,
the $E_1$ block is a polydiene block, selected from the group consisting of polybutadiene, polyisoprene and mixtures thereof, having a molecular weight of from 15,000 to 35,000;
b) 10-55 wt. % of a polypropylene; and
c) 5-20 wt. % thermoplastic vulcanizate; and
(b) forming the injection molded article from the molding composition by injection molding, overmolding, rotomolding, thermoforming, casting, extrusion, profile extrusion, or blow molding;
wherein the injection molded article after 10 days of aging at 120° C. has a gloss that is at least 100% greater than the gloss of the article prior to the aging, as determined by PSA D47 1850.

12. The method of claim 11, wherein the molding composition has a melt flow index of 50-350 g/10 (230° C., 2.16 kg) as measured by ASTM D1238-04.

13. The method of claim 11, wherein step (b) comprises forming a layer having a thickness of at least 0.5 mm.

14. The method of claim 11, wherein the article is a vehicle interior product having positive scratch resistance, wherein the article is selected from interior trim, interior sheathing, door panels, instrument panels, and consoles.

15. An injection molded article formed from a molding composition consisting essentially of:
a) 40-80 wt. % of a hydrogenated styrenic block copolymer having a general formula: S-E-S, $(S-E_1)_n$, $(S-E_1)_nS$, $(S-E_1)_nX$ or mixtures thereof, n has a value of 2 to 6 and X is a coupling agent residue,
wherein prior to hydrogenation,
the S block is a polystyrene block having a molecular weight from 5,000 to 7,000,
the E block is a polydiene block, selected from the group consisting of polybutadiene, polyisoprene and mixtures thereof, having a molecular weight of from 30,000 to 70,000,
the $E_1$ block is a polydiene block, selected from the group consisting of polybutadiene, polyisoprene and mixtures thereof, having a molecular weight of from 15,000 to 35,000;
b) 15-40 wt. % of a polypropylene; and
c) 10-20 wt. % of a thermoplastic vulcanizate;
wherein the hydrogenated styrenic block copolymer has a melt index of at least 12 g/10 minutes according to ASTM D1238 at 230° C. and 2.16 kg weight;
wherein the polypropylene has a melt flow index greater than 300 g/10 min as measured according to ISO 1133-1 condition 230° C./2.16 kg;
wherein the thermoplastic vulcanizate has a Shore A hardness from 60-90 (15 sec, 23° C.) as measured according to ISO 868;
wherein the molding composition has a melt flow index of 50-250 g/10 (230° C., 2.16 kg) as measured by ASTM D1238-04; and
wherein the injection molded article, after 10 days of aging at 120° C., has a % gloss increase of less than 100, relative to an initial gloss, as determined by PSA D47 1850.

16. The article of claim 15, wherein the thermoplastic vulcanizate is a dynamically vulcanized alloy consisting essentially of fully cured ethylene propylene diene methylene rubber particle encapsulated in a polypropylene matrix.

17. The article of claim 15, wherein the polypropylene is selected from: (i) a homopolymer of propylene, (ii) a random copolymer of propylene and an olefin selected from ethylene and $C_4$-$C_{10}$ α-olefins, and (iii) a random terpolymer of propylene with two α-olefins selected from the group of ethylene and $C_4$-$C_{10}$ α-olefins.

18. The article of claim 15, further comprising from 1-15 wt. % of one or more additives selected from the group consisting of a nucleating agent, a clarifier, a release agent, a plasticizer, an antioxidant, a thermal stabilizer, a visible light stabilizer, an ultraviolet light stabilizer, a colorant, a flame retardant, a lubricant, a synergist, a mold release agent, a flow enhancer, an anti-static agent, a filler, a scratch resistance additive, and a surface modifier.

19. The article of claim 15, wherein the article is formed by any of injection molding, overmolding, rotomolding, thermoforming, casting, extrusion, profile extrusion, and blow molding.

20. The article of claim 15, wherein the article is a vehicle interior product including interior trim, interior sheathing, door panels, instrument panels, and consoles, having good heat stability, scratch resistance, and improved gloss values after aging.

* * * * *